United States Patent [19]

Ron et al.

[11] 4,436,539
[45] Mar. 13, 1984

[54] METHOD AND APPARATUS FOR AIR-CONDITIONING BY MEANS OF A HYDROGEN HEAT PUMP

[75] Inventors: Moshe Ron; Matvei Kleiner; Uri Navon, all of Haifa, Israel

[73] Assignee: Technion Research and Development Foundation Ltd., Haifa, Israel

[21] Appl. No.: 309,225

[22] Filed: Oct. 6, 1981

[51] Int. Cl.$^3$ ............................................. F25B 13/00
[52] U.S. Cl. ................................. 62/4; 165/DIG. 17
[58] Field of Search ....................... 62/4, 324.1, 324.2; 423/646, 647, 645; 165/58, DIG. 17

[56] References Cited

U.S. PATENT DOCUMENTS

| | | | |
|---|---|---|---|
| 4,039,023 | 8/1977 | McClaine | 62/4 |
| 4,044,819 | 8/1977 | Cottingham | 62/4 |
| 4,044,821 | 8/1977 | Fletcher | 62/4 |
| 4,161,211 | 7/1979 | Duffy et al. | 62/4 |
| 4,178,987 | 12/1979 | Bowman | 62/4 |
| 4,192,371 | 3/1980 | Derouette et al. | 62/4 |

OTHER PUBLICATIONS

Hycsos: A Chemical Heat Pump and Energy Conversion System Based on Metal Hydrides, Gruen et al., Argonne National Laboratory, ANL-77-39 Jun. 1977.
"Porous Microstructure Metal-Hydride Compact for Rapid Heat Transfer Hydrogen-Storage-Material" by M. Ron.
"Metal Hydrides of Improved Heat Transfer Characteristics" by Moshe Ron, Eleventh Intersociety Energy Conversion Engineering Conference, Sep. 12-17, 1976.
"Heat Transfer Characteristics of Porous Metallic Matrix Metal-Hydrides", Proceedings of an International Symposium held in Geilo, Norway, Aug. 14-19, 1977.
"Preparation and Properties of Porous Metal Hydride Compacts" by M. Ron et al.; Journal of the Less-Common Metals, 74(1980) 445-448.
"Cooling and Heating Power of a Modular Heat-Exchanger Tube Filled with PMH" by Ron et al.; International Symposium on Metal-Hydrogen Systems, Miami, FL 1981.

Primary Examiner—Frank Sever
Attorney, Agent, or Firm—Browdy and Neimark

[57] ABSTRACT

Air-conditioning is carried out using a "hydrogen heat pump" driven by waste heat. The hydrogen heat pump includes at least two and preferably four units, wherein hydrogen passes between low-temperature and high-temperature porous metal hydride compacts, each unit having a pair of heat exchangers associated therewith.

10 Claims, 3 Drawing Figures

METHOD AND APPARATUS FOR AIR-CONDITIONING BY MEANS OF A HYDROGEN HEAT PUMP

FIELD OF INVENTION

The present invention relates to a method for air-conditioning, particularly of vehicles. More particularly, the invention relates to such a method that is based on the absorption and desorption of hydrogen.

BACKGROUND OF INVENTION

The use of hydrogen as a convenient energy carrier and storage medium is increasingly gaining in interest, hydrogen being well recognized as a non-polluting, universally applicable fuel of high caloric value. Moreover, hydrogen may be considered to be available in unlimited quantities, but its general acceptance is conditional on the development of processes for its production. The fuel crises that erupted in 1973 is bound to accelerate the search for new and more economic processes for hydrogen production.

Many uses of hydrogen as fuel have been suggested, and some of them are already applied successfully. Thus, for instance, an improvement of 80% has been observed in the thermal efficiency of an internal combustion engine installed in a motor car, when it was converted for operation on hydrogen.

The concept of a "hydrogen heat pump", by which heat is alternatively absorbed and given off, is one device utilizing hydrogen as energy carrier and storage medium. In that type of hydrogen pump, the working medium is transferred back and forth between two metal hydride systems, the process involving hydrogen absorption and desorption. Broadly speaking, there are available both high-temperature hydrides, working in relatively high temperature ranges, and low-temperature hydrides for low-temperature uses. The hydrogen circulates in a closed circuit and is thus not consumed.

As is well known, metal hydride containers cool down during the desorption of hydrogen, and the utilization of this property for refrigeration has been suggested. This suggestion has however not yet been put to practical use because of certain drawbacks, of which the following two are especially noteworthy:

(1) Insufficient cooling rate, and
(2) low cooling capacity per unit weight.

In a report published by Argonne National Laboratory (ANL-77-39, June 1977) entitled HYCSOS, a chemical heat pump and energy conversion system based on the hydride system $CaNi_5$-$LaNi_5$ is proposed also as space conditioner and for refrigeration applications. The report, however, includes the qualification that the theoretical maximum of work to be drived in one energy conversion cycle, which represents the maximum extractable quantity of heat, is low. This is because the hydride, which is of the low-temperature variety, is the critical component of this particular type of air-conditioner, in which the cycle rate is determined by the rate of the hydrogen desorption from the hydride which is the slowest part of the process. With the aid of heat transfer calculations and actual experimental results it has been established that the desorption rate is, in turn, determined by the heat transfer rate because of the endothermic nature of the chemical reaction involved. This is true as long as the rate of the chemical reaction is higher than the rate of heat transfer needed for the reaction.

SUMMARY OF INVENTION

It is an object of the present invention to provide for the air-conditioning of vehicles with the aid of a hydrogen-based chemical heat pump. It is another object of the present invention to provide a method for air-conditioning vehicles utilizing a hydrogen-based chemical heat pump characterized by an efficient heat transfer. It is yet another object of the present invention to provide an economical method for air-conditioning vehicles with the aid of a hydrogen-based chemical heat pump, the pertinent system utilizing the waste heat from the engine of the vehicle being air-conditioned. It is still another object to overcome the disadvantage in the prior art, such as noted above.

The invention involves air-conditioning vehicles with the aid of a hydrogen-based chemical heat pump, in which the hydrogen is absorbed by, and desorbed from, a dual metal hydride system consisting of two different hydrides, so chosen that the desorption pressure of one metal hydride at a given temperature is higher than the absorption pressure of the other metal hydride at another temperature. In order to achieve continuous operation, the system comprises at least two vessels containing a high-temperature metal hydride and at least two vessels containing a low-temperature metal hydride, one vessel of each kind being connected to one vessel of the other kind. The invention is characterized by the following features:

(1) The high-temperature metal hydride containers are heated by hot gases from the vehicle's exhaust or, alternatively, by hot water, e.g. from the engine's cooling system; and (2) the low temperature metal hydride containers are by turns heated and cooled, each container being connected alternatively to the heat exchanger serving the space to be cooled and to another cooling circuit for cooling the hydride.

The decrease in temperature due to the desorption of hydrogen from the low-temperature metal hydride and the absorption of heat is utilized for the air-conditioning of the vehicles.

The low-temperature metal hydride container may either directly cool the air in the passenger compartment, or it may do so through an intermediate water-carrying radiator. Thus, according to the present invention, heat is recovered from the exhaust gases or from hot water available in the vehicle, and the heat so recovered is utilized for heating the high-temperature metal hydride. A readily available source of hot water is the cooling water from the vehicle's engine; but any other source of heat, e.g. water or other fluid heated by a solar radiation collector, can also be utilized; therefore, the invention can be used in environments other than vehicles. If the vehicle is a bus, the use of the waste heat of the exhaust gases saves up to about 25% of the fuel ordinarily consumed by the bus when equipped with a conventional air-conditioner.

According to a greatly preferred embodiment of the present invention, porous metal hydrides compacts rather than the well-known powdered metal hydrides compacts are utilized. It has been found that, for air-conditioning vehicles, the porous metal hydrides (hereinafter referred to as p.m.h. compacts) possesses two main advantages over the powdered variety:

(1) Their heat conductivity and heat diffusivity are much higher, a quality which makes for an improved heat transfer rate; and (2) the duration of the cycle for the hydrogen absorption-desorption operation is shorter, a fact which increases the cooling power of the system.

These advantages render the hydrogen-based chemical heat pump according to the present invention an efficient tool for air-conditioning vehicles, overcoming the usual disadvantages of conventional air-conditioning systems. The heat conductivity of a p.m.h. compacts material is higher by more than an order of magnitude than that of a comparable powder metal hydride. In order to achieve a high cooling power per kg of hydride, say of the order of 1,000 Btu/h/2 kg of hydride, while yet maintaining a low weight of the hydride system (hydrides and containers), a high heat transfer rate is mandatory. The heat transfer rate is determined mainly by the thermal conductivity of the metal hydride, which is low compared with that of the tubes containing the hydrides. The high heat transfer rate of porous metal hydride compacts permits a short duration to be adopted for the absorption-desorption cycle of the hydrogen, and it thus contributes to an efficient air-conditioning action of the system.

Another of the main advantages of the system is the fact that the source of energy required for the desorption of hydrogen from the high-temperature hydride is the waste heat of the engine of the vehicle to be air-conditioned. The entire system has no compressor or, in fact, any other moving parts, with the exception of those in the controlling system, air-handling system and, if needed, water pumps.

The air-conditioner according to the present invention consists of at least two pairs of containers filled with metal hydrides: at least one pair is filled with a low-temperature metal hydride, while the other pair is filled with a high-temperature metal hydride. The containers are interconnected by pipes for the transfer of hydrogen from one to the other. The hydrides are so selected from those known to the art that the desorption pressure at a given temperature of one metal hydride is higher than the absorption pressure at another temperature of the other.

For the cooling action to be effective, the desorption temperature of the low-temperature hydride is preferably below 10° C. In the low-temperature portion of the cycle the heat needed for decomposing the hydride is taken from the ambient air, which is thereby cooled. Alternatively, water cools down when passing through the tubes provided for that purpose inside the metal hydrides, and it then cools the ambient air by means of radiators. The second hydride (the so-called high-temperature metal hydride) functions in a similar way, but at a higher temperature, to which it is heated by the exhaust gases of the engine or, alternatively, by hot water such as that circulating in the engine's cooling system or supplied by a solar heating system.

BRIEF DESCRIPTION OF DRAWING

To better describe the invention, certain exemplary embodiments thereof will now be described by reference to the drawing, where.

DETAILED DESCRIPTION OF EMBODIMENTS

Figure 1:
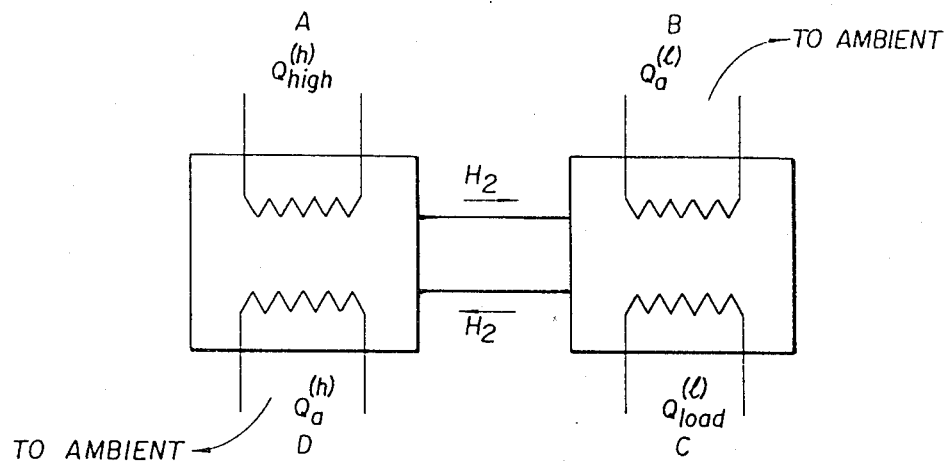
FIG. 1 is a schematic view of a simplified embodiment.

In FIG. 1, a system based on two different metal hydrides, a low-temperature hydride (l) and a high-temperature (h), is illustrated schematically. For the purpose of the following explanation the cycle is assumed to start from the stage where the high-temperature hydride absorbs the hydrogen. Hot exhaust gas from the vehicle's engine or hot water from the engine's cooling system or other source at point A is made to pass through tubes in the tank (h), thus increasing the temperature and the pressure of the high-temperature hydride in tank (h). When a temperature sufficient for hydrogen desorption from the high-temperature hydride has been reached, hydrogen is driven from such high-temperature hydride (endothermic reaction) and flows from tank (h) into tank (l), where it becomes absorbed (exothermic reaction) by the low-temperature hydride, it being understood that the high-temperature hydride pressure is higher than the low-temperature hydride absorption pressure under the relative temperature conditions which exist during this phase of the cycle (see FIG. 2). As the hydrogen flows into tank (l) and is absorbed by the low-temperature hydride, the temperature thereof begins to increase. However, as this occurs, the temperature of the low-temperature hydride is prevented from rising by heat exchange with the ambient outside air at point B.

Upon completion of the hydrogen absorption in tank (l), the second phase of the cycle is initiated. The tank (h) is quickly cooled by heat exchange with outside ambient air to a temperature at point D at which the pressure is low and hydrogen can be absorbed, such cooling of the tank (h) being achieved by cutting off the source of waste heat and by means of a special cooling circuit exchanging heat with the ambient atmosphere (point D). As soon as the generation of heat from the exothermic absorption of hydrogen has ceased, the temperature in tank (l) is reduced to near ambient by the continued heat exchange with outside air (point B). Endothermic desorption from tank (l) then promptly occurs which has the effect of dropping the temperature of the low-temperature hydride even further to the desired value. At point C heat is thus absorbed from the space to be cooled (e.g. the passenger compartment) which maintains the hydrogen pressure in tank (l) and causes further hydrogen desorption from the low-temperature hydride, it being understood that the hydrides are so selected that during this phase of the cycle, the low-temperature hydride desorption pressure is higher than the high-temperature hydride absorption pressure.

Figure 2:
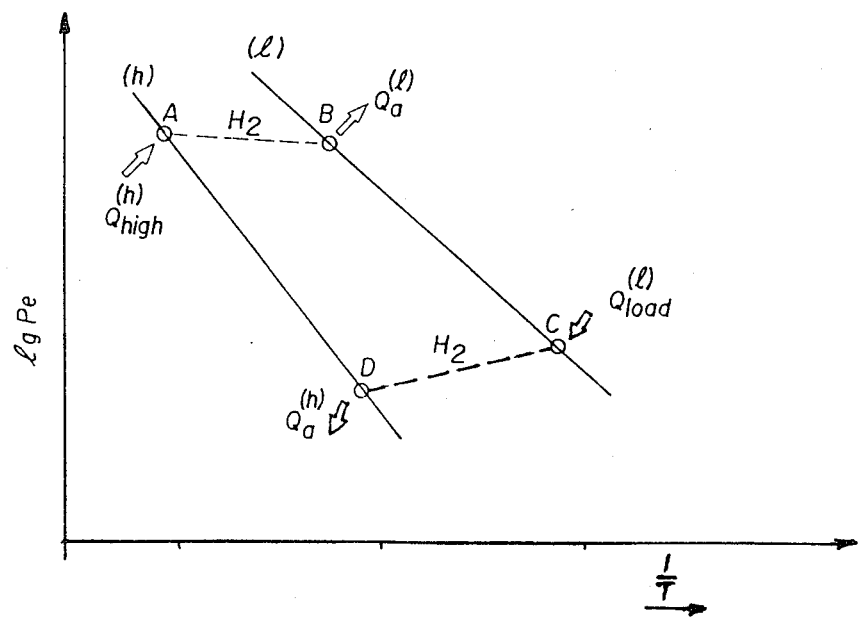
FIG. 2 is a thermodynamic diagram in terms of pressure and reciprocal temperature (1/T)

In FIG. 2, the high (h) and the low-temperature (l) hydrides are partially represented by one straight line each. At the point of highest temperature, A, an amount of heat, $Q_{high}$, is supplied to the high-temperature hydride. At that temperature, hydrogen is desorbed from the high-temperature hydride at a pressure that is high enough for forcing the hydrogen into the low-temperature hydride. At point B (lower in pressure and temperature than point A) hydrogen is absorbed by the low-temperature hydride, absorption being made possible by rejecting heat from the low-temperature hydride to the ambient, whereby the pressure is kept at a point below that of the high-pressure hydride. At the beginning of the hydrogen desorption from the low-temperature hydride, the latter is allowed to cool down to point C, first by heat exchange with the ambient and then by endothermic desorption of hydrogen. At point C, the point of lowest temperature of the cycle (0–12° C.), heat $Q_{load}$ is supplied from the air in the space to be air-conditioned, which cools as a result. Also at point C, hydrogen is desorbed at a pressure higher than the absorption pressure, at point D, of the high-temperature hydride, which can thus absorb the hydrogen. This is further rendered possible (point D) by the cooling of the high-temperature hydride by means of rejecting heat to the ambient.

Temperature and pressure differentials are smallest at point C. If the rate of the chemical reaction (desorption) is high enough, the heat-flow rate controls the hydrogen desorption rate; but since the temperature differentials are small, the heat conductivity is of critical importance to the heat flow rate, and the use of porous metal matrix hydrides (p.m.h. compacts) is essential, as will be explained below.

Taking a hypothetical example based on FIGS. 1 and 2, exhaust gases at about 600° C. heat the high-temperature hydride to about 500° C. corresponding to point A. Hydrogen is driven to tank (l) where it is absorbed by the low-temperature hydride at about 60° C. corresponding to point B. At this stage the temperature is maintained in tank (l) at about 60° C. by heat exchange with the ambient air incoming at about 30° C. and leaving at about 50° C.

When the exothermic absorption in tank (l) has ceased, the temperature therein quickly drops to about 30° C., the ambient temperature, due to the continued heat exchange with the ambient atmosphere. In the meantime, the temperature in tank (h) drops quickly to about 70° C., corresponding to point D, by heat exchange with the ambient atmosphere, the air inlet temperature being about 30° C. and the air outlet temperature being about 50°–60° C.

The pressure at point D is lower than the pressure at point C. Therefore, tank (h) is capable of accepting hydrogen from tank (l); hydrogen desorbs from the low-temperature hydride endothermically causing a drop in temperature to 3° C., corresponding to point C. Heat exchange is then effected between the compartment to be cooled (i.e. air-conditioned) and tank (l), the air incoming to tank (l) being at 20° C. and the air exiting tank (l) being at about 10° C.

The foregoing explanation applies to air-conditioning systems using direct heat exchange with air in a manner known to the art, both in the space to be air-conditioned and in the ambient, as well as to systems in which water, in an intermediate system of radiators, is the cooling medium.

Figure 3:
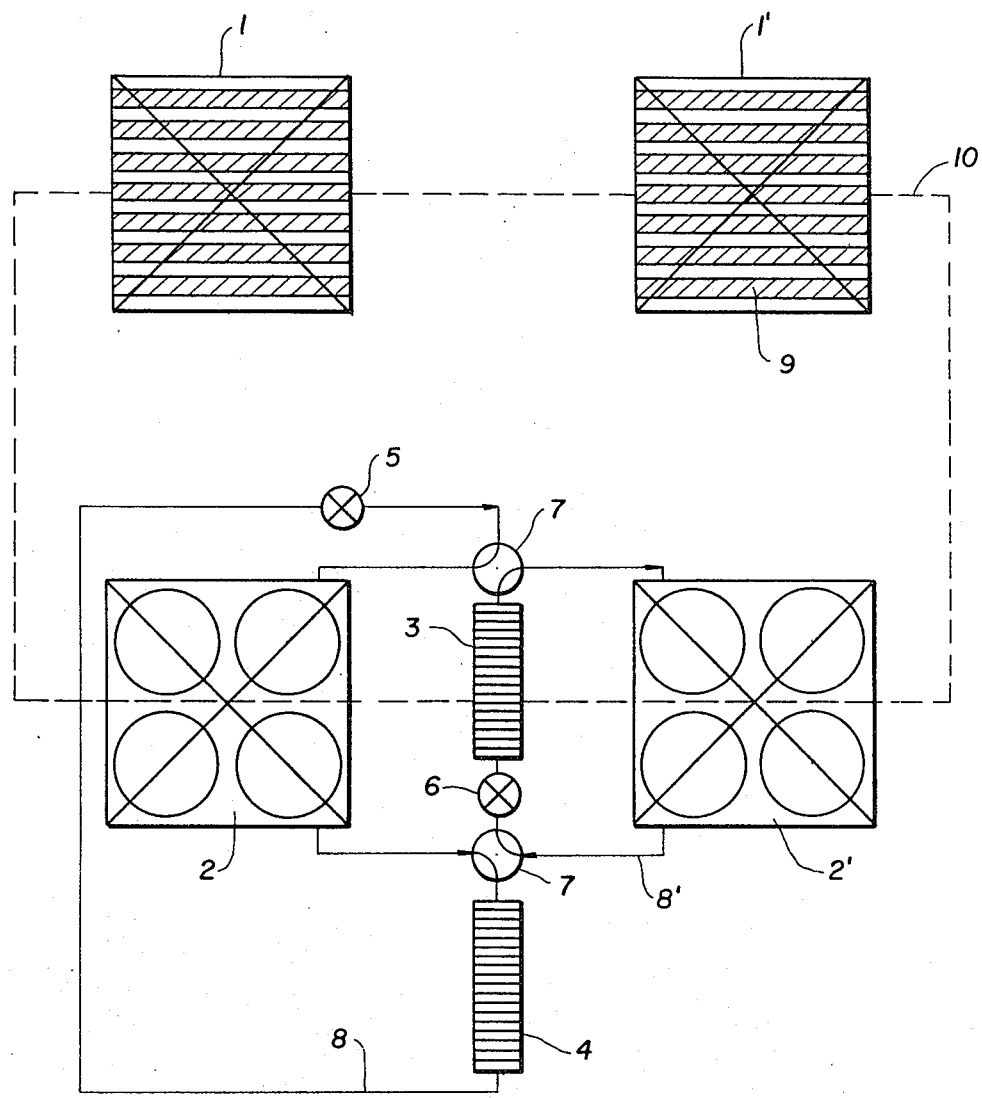
FIG. 3 is a schematic representation of an air-conditioning system in accordance with the present invention utilizing water as intermediate cooling medium.

In FIG. 3, a pair of hydride tanks, 1 and 2, filled respectively with high and low-temperature hydrides, are connected by hydrogen ducts (not shown). Another substantially identical pair of hydride tanks 1' and 2' are similarly connected. Two radiators 3 and 4 of an intermediate water circuit are connected by means of pipes to the heat exchangers built into the low-temperature hydride tanks 2 and 2'. Two identical valves distribute the water alternately to one or the other of the two low-temperature hydride tanks 2 and 2'. By these means the water is made to flow alternately, through one of the radiators 3 and 4 in the space to be air-conditioned, and through the other of radiators 3 and 4 rejecting heat to the ambient.

In the two high-temperature hydride tanks the tubes filled with hydrides are designated by hatching, while the space around the tubes, intended for the passage of hot gases and, alternately, of cooling air, are shown white. In an alternate embodiment, the hot gases and cooling air are conducted through the tubes, and the hydride is packed into the spaces between the tubes.

In order to extract the maximum possible heat from the exhaust gases, two high-temperature metal hydrides, reacting in different temperature ranges, are arranged in series. One kind of hydride operates in the range, 600°–250° C., the other in the range, 300° C. and below. Hot gas from the exhaust is first admitted through the former and then through the latter. This arrangement is of special importance when the engine is idling, e.g. at stops. In that case the exhaust gases are of a considerably lower temperature that when the vehicle is moving, and they may then operate only the lower-temperature-range hydride.

The tanks of high and low-temperature hydrides are similar in construction, but the diameter of the tubes in the high-temperature tank is larger than that of the tubes in the low-temperature tank, and there are fewer tubes in the former. The high-temperature tank may also be so constructed that the hydride is enclosed in the tubes whereas the heating medium flows through the tank in the space surrounding the tubes. This improves the efficiency of the heat transfer.

According to a most preferred embodiment of the present invention, porous matrix metal hydride (p.m.h. compacts) rather than powdered hydride is used as a storage medium for the hydrogen, because powdered metal hydride has poor heat transfer properties, which considerably restricts its usefulness as a hydrogen storage device. Porous metal hydride compacts are described in the Ron et al U.S. Pat. No. 4,292,265.* Also, the small particle size of the metal hydride powders necessitates the provision of filters in order to prevent particles from entering the hydrogen streams. It also eliminates the problem of tube and container swelling.

*Also see "Preparation and Properties of Porous Steel Metal Hydride Compacts", Ron et al, *Journal of the Less Common Metals*, 74 (1980) 445–448.

Following repeated cycling, particle size is further reduced due to attrition. This leads to the accumulation of micro-size particles, which clog the filters and cause pressure to drop across the bed. The porous metal hydride compacts, on the other hand, consists of a porous metallic skeleton, inert to hydrogen, in which metal hydride particles have been incorporated. The microstructure lends thermal conductivity of a metallic character even when the composite material is in the fully hydrided state. The thermal conductivity of the different metals suitable for a porous matrix is higher by a factor of approximately 20–200 than that of the hydrides most commonly used. Moreover due to the higher heat diffusivity of the porous metal hydride compacts compared with that of the powdered variety, the access of the heat flow to the metal hydride compacts particles is improved, thus facilitating the metal hydride to accept hydrogen. The utilization of porous metal hydride thus features the following advantages:

It greatly improves the steady state and transient heat transfer rates.

It increases the rates of hydrogen charge and discharge and reduces response times.

It significantly facilitates the heat control of a hydrogen storage device and simplifies its design and construction.

It does not cause swelling of tubes as powdered hydrides do.

It does not undergo attrition, as does the powdered metal hydride, and it thus avoids polluting the environment with large quantities of fine powders.

The porous metal hydride is a compact material and can be produced as a metallic skeleton into which metal hydride particles have been embedded. Generally speaking, the method for its manufacture involves sintering and other known metallurgical treatments, which can be worked out by the person versed in the art to suit the different varieties of p.m.h. compacts. A theoretical review of the expected thermal properties of the p.m.h. compacts and their effect on the heat transfer and heat exchange of hydrogen storage devices, was presented by one of the inventors at the 11th Intersociety Energy Conversion Engineering Conference, Sept. 12–17, 1976.

Today there are a number of metal hydride systems which may be utilized as large-scale storage materials. The properties of several metal hydrides and alloys as hydrogen storage media are listed in a publication by R. H. Wiswall et al (B.N.L. 16889, Intersociety Energy Conversion Engineering Conference, 1972).

Table 1 lists some typical values for the heat conductivity of some metal hydrides, the powder and p.m.h. compacts versions being compared.

TABLE 1

Typical values of heat conductivity in W/m °K.

| System | Hydrided p.m.h. compacts | Hydrided powder | Dehydrided p.m.h. compacts | Dehydrided powder |
|---|---|---|---|---|
| Mg—H | 20 | 0.2–0.9 | 50–80 | ~5 |
| LaNi$_5$—H | 20 | 0.2–0.9 | 35–50 | 0.5 |
| Mg$_2$Ni—H | | | | |
| CaNi$_5$—H | | | | |
| MNi$_5$—H | 20 | 0.2–0.9 | 35–50 | 0.5–1.0 |
| TiFe—H | | | | |

M = Mischmetal with rare earth constituent.

Table 1 clearly illustrates the great advantage of the p.m.h. compacts as regards heat conductivity over the powder metal hydride.

Among the various metal systems suitable for the present invention, TiFe-H and MgH-H are worth mentioning in particular. TiFe-H is an intermetallic compound with excellent characteristics, such as low heat of formation, convenient pressure and temperaure cycling range, and reasonable rates. MgH-H is a lightweight hydride produced from a metal of relatively low cost; but it has a higher heat of formation, and cycling must be conducted in a higher heat of formation, and cycling must be conducted in a higher temperature range. Some pertinent properties of the powdered form of the two above hydrides are given in Table 2.

TABLE 2

Properties of TiFe—H and MgH—H (powdered form)

| | TiFe—H | MgH—H | |
|---|---|---|---|
| Hydrogen content W/O | 1.5 | 7.3 | |
| Bulk density | 350–380 | 90.4 | lb/ft$^3$ |
| Heat of dissociation | 7250 | 10650 | Btu/lb of H$_2$ |
| Heat capacity | 0.15 | 0.25 | Btu/lb/°F. |
| Thermal conductivity | ~1 | 0.3 | Btu/hr. °F.-ft. |

TiFe-H is suitable for use as a low-temperature hydride, and it is relatively inexpensive. Its properties, e.g. its kinetics, can be improved by alloying and by the manner of processing. MgH-H, on the other hand, is very suitable as a high-temperature hydride. It has a high Wt/o H$_2$ and is quite inexpensive. Examples of other metal hydrides which can be successfully utilized are:

FeTi-H; LaNi$_5$-H; (M)Ni$_5$H; Mg-H; Mg$_2$Ni-H; Mg(Ni)-H; Mg(Cu)-H; FeTi(Mn)-H; CaNi$_5$-H; M-Mischmetal.

LaNi$_5$-H is rather more expensive, but it is most useful as a low-temperature hydride, particularly in view of its very rapid chemical reaction rate. LaNi$_5$ is a rare-earth intermetallic compound, easily made by alloying stoichiometric quantities of lanthanum and nickel.

The system of the present invention can be successfully applied to the air-conditioning of motorized vehicles of many types, but it is most particularly useful in buses, where the total weight of the air-conditioning system does not constitute a critical factor. A special advantage for buses is the substantial decrease in thermal pollution brought about by such an air-conditioner. Preliminary design and calculation show that a compact system having one tank each of low-temperature and of high-temperature hydride has a cooling power of about 15,000 Btu/h. In practice two or more tanks of each of the two varieties will be utilized with a corresponding increase in the cooling power. While the use of hydrides to hold hydrogen for use as fuel to power a motor vehicle is presently considered difficult because of the weight of hydrides necessary for such purpose, this problem does not exist in the present invention because the quantity of hydride necessary is far less; thus to provide a cooling capacity of 7 tons (84,000 Btu/hr.), the weight of the unit would be 445 kg, comparable to the weight of conventional bus air-conditioning units. This would provide a power per kg. of unit of 188 Btu/hr.

While the invention has been described in connection with specific embodiments thereof, it will be understood that it is capable of further modifications, and this patent is intended to cover any variation, uses, or adaptions of the invention following in general the principle of absorption-desorption of hydrogen by a compact porous structure of metal hydride and including such departures from the present disclosure as come within known or customary practice in the art to which the invention pertains and as may be applied to the essential features hereinbefore set forth and as fall within the scope of the invention.

What is claimed is:

1. A method of air-conditioning a vehicle using a hydrogen-based chemical heat pump including a dual metal hydride system of two different hydrides capable of passing hydrogen therebetween, and wherein one of the hydrides is a low-temperature hydride and the other a high-temperature hydride, said method comprising
    providing said low temperature hydride in the form of a porous metal compact;
    heating with waste heat from said vehicle high-temperature hydride having hydrogen absorbed therein to cause desorption of said hydrogen from said high-temperature hydride and flow to said low-temperature hydride;
    absorbing said hydrogen by said low-temperature hydride while cooling said low-temperature hydride by heat exchange with the ambient atmosphere;

stopping the flow of waste heat to said high-temperature hydride upon completion of desorption; and cooling said high-temperature hydride by heat exchange with the ambient atmosphere to provide said high-temperature hydride with a sufficiently low-temperature at which it is capable of absorbing hydrogen from said low-temperature hydride; and further cooling said cooled low-temperature hydride containing said hydrogen absorbed therein by desorbing hydrogen therefrom and then heating at a high heat transfer rate said cooled low-temperature hydride by heat exchange with the environment being air-conditioned and further desorbing said hydrogen from said low-temperature hydride and passing said hydrogen to said cooled high-temperature hydride where said hydrogen is absorbed thereby.

2. A method according to claim 1 wherein said high temperature hydride is in the form of a porous matal hydride compact.

3. An air-conditioning unit for a vehicle based on a hydrogen heat pump, comprising:

a high-temperature hydride tank and a low temperature hydride tank, a fixed quantity of hydrogen disposed within at least one of said tanks, means for passing said hydrogen between said tanks, first heat exchange means between a source of waste heat from said vehicle at a high-temperature and said high-temperature hydride tank, second heat exchange means between ambient and said high-temperature hydride tank, third heat exchange means between ambient and said low-temperature hydride tank, fourth heat exchange means between a space to be cooled and said low-temperature hydride tank, and control means to control the operation of all said heat exchange means in sequence to effect heating of said high-temperature hydrides tank, desorption of hydrogen therefrom and absorption in said low-temperature hydride tank, followed by desorption of hydrogen from the low-temperature hydride tank, cooling of said space to be cooled and absorption of hydrogen in said high-temperature hydride tank;

said high-temperature hydride tank and said low-temperature hydride tank respectively containing therein a high-temperature metal hydride and a low-temperature metal hydride in the form of low-temperature porous metal hydride compacts, said hydrides being so selected that the desorption pressure of said high-temperature metal hydride is higher than the absorption pressure of said low-temperature hydride at temperatures prevailing in said tanks during desorption from said high-temperature hydride tank, and the desorption pressure of said low-temperature metal hydride is higher than the absorption pressure of said high-temperature metal hydride at temperatures prevailing in said tanks during desorption from said low-pressure hydride tank.

4. An air-conditioning unit according to claim 3 comprising two each of said tanks.

5. An air-conditioning unit according to claim 4 wherein said fourth heat exchange means comprises at least one intermediate water-carrying radiator.

6. An air-conditioning unit accoding to claim 1, wherin the low-temperature hydride is one having a desorption temperature below 10° C.

7. An air-conditioning unit according to claim 6, having a power of at least about 188 Btu/hr./kg. of unit weight.

8. An air-conditioning unit according to claim 6, having a power of at least about 188 Btu/hr./kg. of unit weight.

9. An air-conditioning unit according to claim 3 or 4 wherein the low-temperature hydride is one having a desorption temperature below 10° C.

10. An air-conditioning unit according to claim 3 or 4 having a power of at least about 188 Btu/hr./kg. of unit weight.

* * * * *